Sept. 16, 1958 K. MacGREGOR 2,852,342
MANUFACTURE OF SULPHATE OF AMMONIA
Filed Oct. 10, 1955
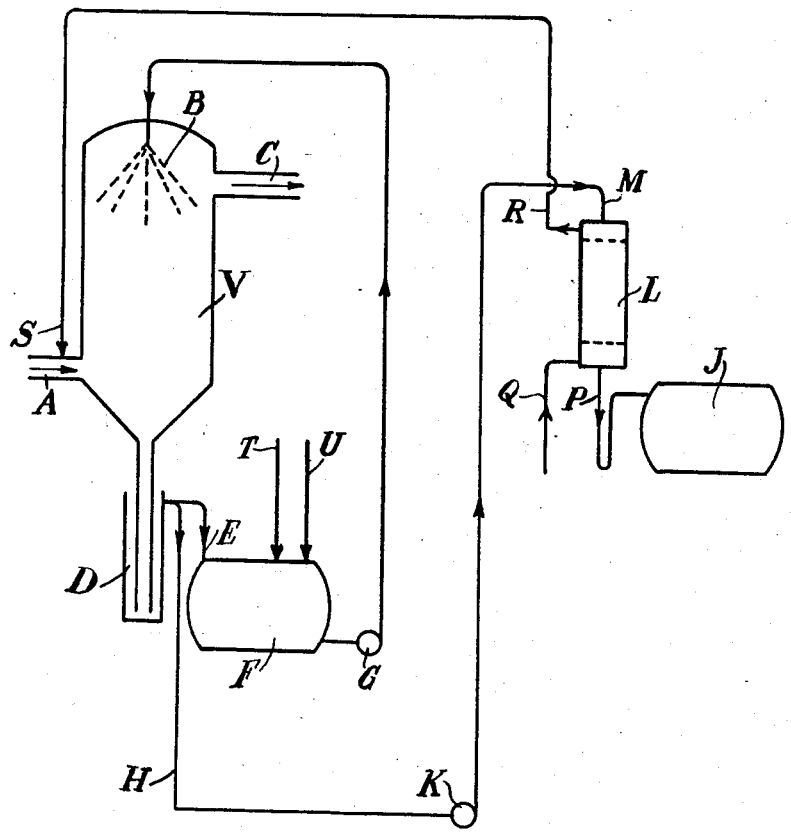
Inventor
K. MacGregor
By Hancock Downing Seebold
Attys.

United States Patent Office 2,852,342
Patented Sept. 16, 1958

2,852,342

MANUFACTURE OF SULPHATE OF AMMONIA

Kenneth MacGregor, Bramhall, England, assignor to Simon-Carves Limited, Cheadle Heath, England, a British company Application October 10, 1955, Serial No. 539,574

Claims priority, application Great Britain October 14, 1954

2 Claims. (Cl. 23—119)

This invention relates to the treatment of gases containing ammonia, such as coke oven gas or similar fuel gases, with sulphuric acid solution, to produce a solution of ammonium sulphate containing free sulphuric acid which is subsequently treated in an evaporator to recover the ammonium sulphate. When a solution of ammonium sulphate containing free sulphuric acid is treated in an evaporator, the acidity of the liquor increases. The resulting concentration of acid depends upon the concentration of free acid in the liquor fed to the evaporator, and if this is high, serious corrosion of the evaporator can occur. On the other hand, a certain minimum concentration of free acid is necessary in the liquor used for scrubbing the gases in order to remove the ammonia effectively. The object of the invention is to provide a means of reducing the acidity of the liquor before feeding it to the evaporator.

According to the invention the acid liquor before being fed to the evaporator is brought into contact with the vapours containing a high proportion of ammonia whereby part of the free acid in the liquor is converted into ammonium sulphate, and the acidity of the liquor passing to the evaporator can be easily controlled by suitable adjustments of the flow of liquid and vapour.

The acid liquor may be introduced at the top of a small ring-packed tower, the vapours which may be obtained from a conventional ammonia still being introduced at the bottom of the tower. Any vapours not absorbed leave the tower at the top and are introduced into the coke oven gas stream prior to washing it with acid in the main scrubber.

In this way the acidity of the liquor in the evaporator is maintained at a low value so that corrosion is avoided and the ammonium sulphate crystals produced are improved in size without reducing the efficiency of removal of ammonia from the gas stream.

The accompanying drawing shows diagrammatically one suitable arrangement for the operation of the invention.

The coke oven or similar gas containing ammonia is introduced into a main scrubber V at A and leaves at C. In the scrubber V it is treated with a solution of ammonium sulphate containing free sulphuric acid which is introduced as a spray at B. In this case the scrubber is an empty vessel but packing materials or bubble hoods may, if desired, be used to distribute the liquor. The liquor falls into a seal pot D and overflows, entering a tank F at E. From this tank, liquor is pumped by a pump G back to the spray B. Sulphuric acid is added at T so as to maintain the concentration of free acid in the liquor, and water is added at U to prevent the concentration of ammonium sulphate from rising to such an extent that crystals of ammonium sulphate would be deposited in the scrubber.

A stream of liquor is bled off from the circuit through a pipe H, and is pumped by a pump K to a small packed scrubber L, entering it at M and leaving at P. Vapours from an ammonia still are introduced into the bottom of this scrubber L at Q and removed at R. In the scrubber L ammonia from the vapours reacts with free sulphuric acid liquor so that the acidity of the liquor leaving at P is reduced. This liquor then flows to a storage tank J and thence to an evaporator system of conventional design, where ammonium sulphate crystals are produced. The vapours leaving the scrubber R may still contain ammonia and are consequently introduced into the coke oven gas stream at S prior to treatment of the gas in the main scrubber V.

The vapours from the ammonia still may be cooled so as to remove water vapour from them prior to entering the scrubber L by heat exchange with the crude liquor being fed to the ammonia still.

What I claim is:

1. In a method of reducing the acidity of ammoniacal liquor obtained by contacting gases from a carbonisation plant with a liquor containing free sulphuric acid in a single step, followed by the production of sulphate of ammonia in an evaporator, the intermediate step of contacting the ammoniacal liquor contained in the said single stage scrubber with the ammonia vapours from the ammonia still in order to reduce the free acid content of the said ammoniacal liquor and thus reduce the corrosive effect of the said ammoniacal liquor in the said evaporator plant.

2. A method of obtaining sulphate of ammonia, comprising contacting ammonia-containing gases from a carbonisation plant in a single step with acid liquor containing free sulphuric acid, then scrubbing said contacted acid liquor with ammoniacal vapours obtained from an ammonia still whereby the free acid content of the acid liquor is reduced, the residue of the ammoniacal vapours being added to the incoming carbonisation plant gases, and treating the scrubbed and contacted acid liquor in an evaporator to obtain sulphate of ammonia from the liquor.

References Cited in the file of this patent

UNITED STATES PATENTS

| | | |
|---|---|---|
| 1,880,631 | Wingert | Oct. 4, 1932 |
| 1,917,915 | Atwater | July 11, 1933 |
| 1,923,212 | Jost et al. | Aug. 22, 1933 |
| 2,368,901 | Tiddy | Feb. 6, 1945 |
| 2,482,643 | Tiddy | Sept. 20, 1949 |
| 2,509,520 | Otto | May 30, 1950 |